United States Patent [19]

Emmel

[11] Patent Number: 4,483,589
[45] Date of Patent: Nov. 20, 1984

[54] INDEXING MECHANISM FOR ROTATABLE NOSEPIECE OF A MICROSCOPE

[75] Inventor: Henry J. Emmel, Rochester, N.Y.

[73] Assignee: Bausch & Lomb Incorporated, Rochester, N.Y.

[21] Appl. No.: 448,142

[22] Filed: Dec. 9, 1982

[51] Int. Cl.³ .................... G02B 7/16; G05G 5/06; H01H 1/06; H01H 1/26

[52] U.S. Cl. .................... 350/254; 74/527; 200/153 LB; 200/260; 200/277; 200/291; 350/520

[58] Field of Search .............. 350/254, 414, 422, 520, 350/523, 526, 559; 403/DIG. 6, DIG. 8; 74/10.41, 527; 200/153 LB, 260, 277, 291; 70/194–195

[56] References Cited

U.S. PATENT DOCUMENTS

| | | | |
|---|---|---|---|
| 1,893,327 | 1/1933 | Howell | 350/254 |
| 2,621,563 | 12/1952 | Jones | 350/254 |
| 3,229,051 | 1/1966 | Hauser et al. | 200/277 |
| 3,246,089 | 4/1966 | Lieberman et al. | 200/277 |
| 3,311,717 | 3/1967 | Lace | 200/277 |
| 3,487,761 | 1/1970 | Larue, Jr. | 350/254 |
| 3,631,775 | 1/1972 | Tidd | 350/254 |
| 3,878,736 | 4/1975 | Main et al. | 74/527 |

FOREIGN PATENT DOCUMENTS

| | | | |
|---|---|---|---|
| 1151331 | 5/1969 | United Kingdom | 200/277 |
| 2062276 | 5/1981 | United Kingdom | 350/523 |

*Primary Examiner*—William H. Punter
*Attorney, Agent, or Firm*—John S. Norton; Bernard D. Bogdon; DeWitt M. Morgan

[57] ABSTRACT

An indexing mechanism for an optical instrument, such as a microscope, includes a support, a rotatable assembly having a plurality of detents, and a fixed member and a rotating wheel mounted to a spring. The non-rotating member is adapted to engage the detent formed in a flange on the nosepiece shell to provide positive and accurate alignment between the support and the rotatable assembly. When the rotatable assembly is rotated relative to the support, the rotating wheel engages the flange and provides for essentially friction-free rotation between detents. By insulating the spring and rotating wheel, the indexing mechanism may be used as a switch to control an electrical function of the optical instrument.

8 Claims, 5 Drawing Figures

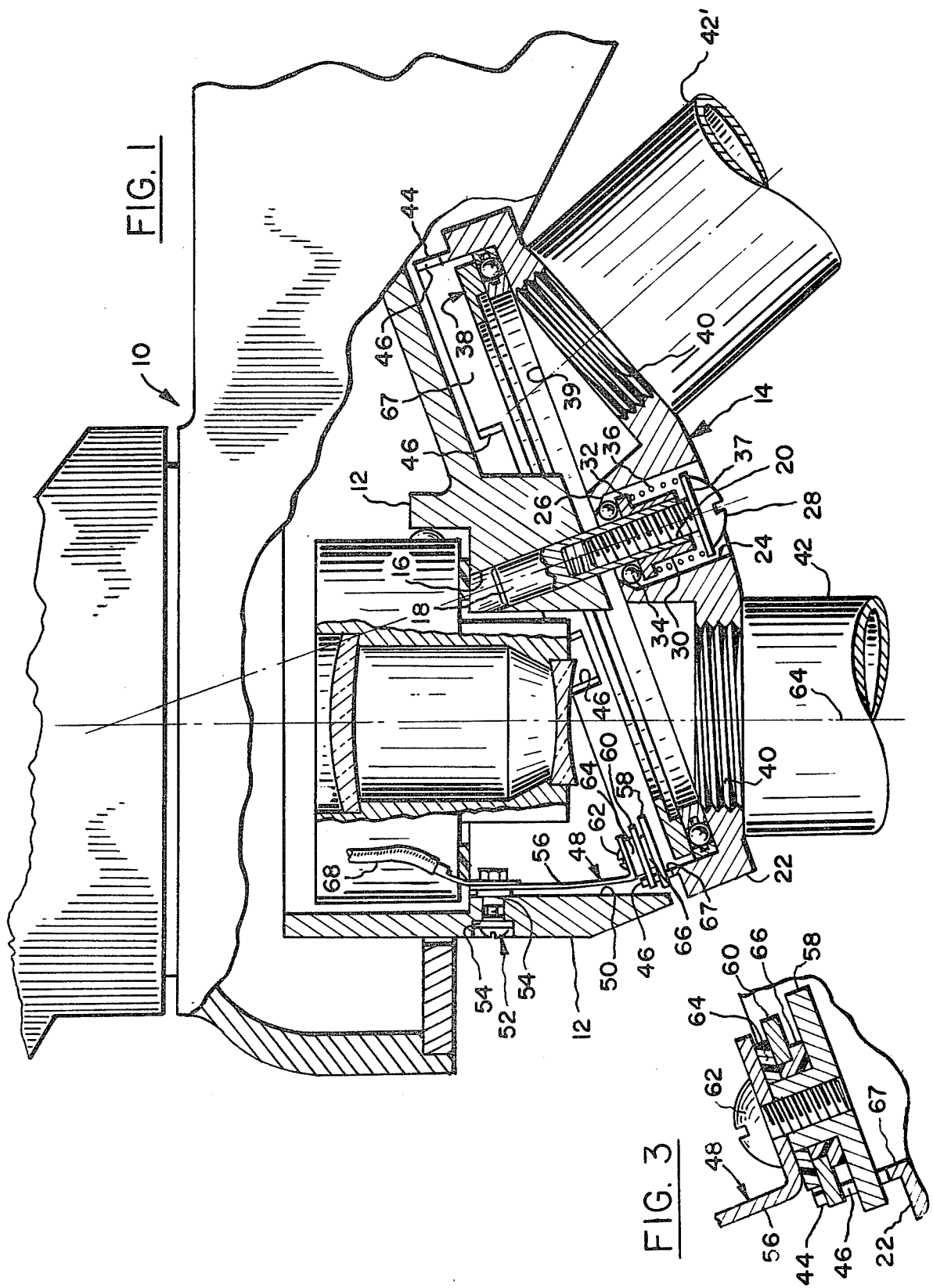

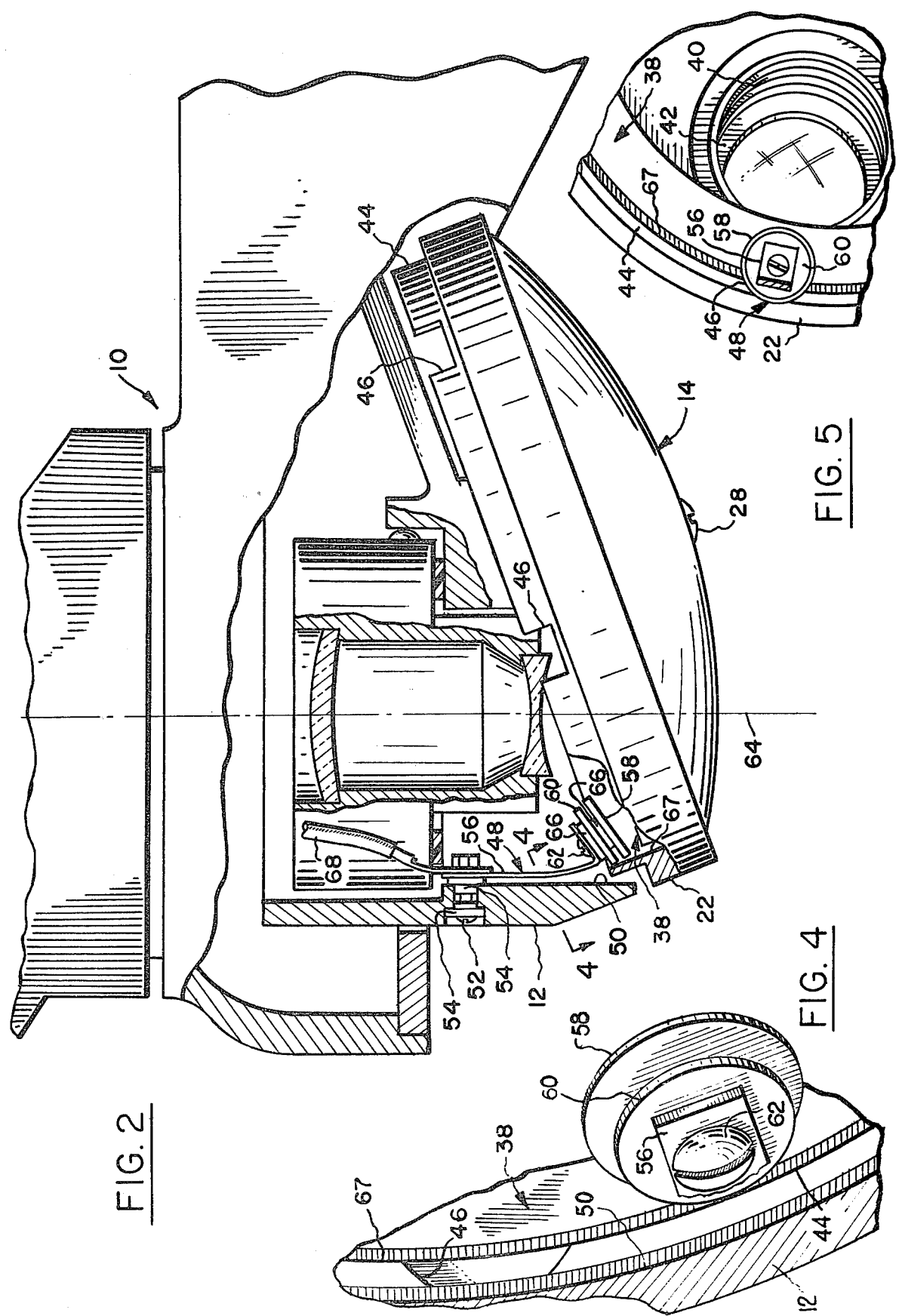

INDEXING MECHANISM FOR ROTATABLE NOSEPIECE OF A MICROSCOPE

BACKGROUND OF THE INVENTION

1. Field of the Invention:

The present invention is directed toward an indexing mechanism for a multiple objective nosepiece of an optical instrument, such as a microscope. The indexing mechanism provides for repeatedly accurate alignment of each individual objective with the optical axis of the instrument and for friction-free rotational movement of the nosepiece when changing objectives.

The indexing mechanism also may be connected to a source of electrical energy and utilized as a switch to control an electrical function of the instrument or accessory associated therewith.

2. Description of the Prior Art:

The characteristics of a microscope nosepiece which has multiple objectives are that (1) it should be able to provide for repeatedly accurate alignment of the selected objective with the optical axis of the instrument, (2) there should be positive locking location of the nosepiece when the selected objective is axially aligned, (3) there should be essentially very little torque involved to rotate the nosepiece to change objectives, and (4) the nosepiece and cooperating indexing mechanism should be fairly simple to construct and maintain, resulting in relatively low manufacturing and servicing costs.

The constant problem of providing positive and accurate alignment of each objective with respect to the instrument's optical axis has been addressed many times over by a wide variety of construction methods.

One such solution was proposed by C. J. Bowerman in U.S. Pat. No. 3,656,759, which issued Oct. 27, 1953. In this apparatus, a detent mechanism operates between the stationary support arm and the rotatable nosepiece of a microscope. Essentially, the mechanism provides for a rounded button which is pressed into engagement against the peripheral edge of the nosepiece by a flat spring which is mounted to the support arm. The button and spring assembly act as the detent member when received within shallow slots formed in the edge of the nosepiece.

A further apparatus, shown by B. W. Jones in U.S. Pat. No. 2,621,563, issued Dec. 16, 1952, utilizes a construction similar to the device of Bowerman.

The above-referenced devices generally suffer from similar problems. The detenting mechanism has, in each application, a non-rotatable button or ball mounted to a leaf spring. The non-rotatable ball is biased into engagement against a complementing surface on the nosepiece shell. A plurality of raised ramps is formed on the surface such that as the nosepiece shell is rotated, the ball engages the ramps. Continued rotation of the nosepiece shell forces the spring to flex and the ball to slide along the ramp until it reaches the detent. The spring then forces the ball into the detent. The action of sliding the ball along the surface of the nosepiece creates unwanted friction. Further, because of the friction, parts are caused to wear. The friction drag and the wearing have been endured for lack of a better system.

These systems further suffer from the inherent problem that operators may frequently apply more torque to the nosepiece shell than necessary and, consequently, rotate past the desired objective. This happens because the rotation of the nosepiece shell between detents is easily accomplished whereas when a detent is initially encountered frictional drag becomes very noticeable. To overcome this situation the operator applies more torque. Frequently, this additional torque causes over-rotation as the point contact formed between the ball and shallow detent slot is not sufficient to stop the nosepiece shell from rotating.

The detenting system shown by Bowerman has a further disadvantage in that it is mounted externally so that it is directly exposed to dust and other foreign debris which cause additional friction and premature wear.

Another indexing mechanism is disclosed by T. G. Aitcheson in U.S. Pat. No. 2,565,419 issued Apr. 21, 1951. In this apparatus a spring arm is mounted to the inner wall of a microscope turret housing. The spring arm carries a small roller which engages any one of a plurality of V-shaped notches which are formed in the periphery of the carrier. When the carrier is rotated the roller is forced outwardly by the notch and rolls along the periphery of the carrier.

The system suffers from the problem that unless the roller and the axle to which it is mounted are perfectly concentric with each other, par-centration will be extremely difficult to achieve. That is, the error between the roller and axle will transfer to the carrier which results in unacceptable error in the optical alignment. This arrangement has a further drawback in that the roller is small and the V-shaped notch is correspondingly small, over-rotation of the carrier is likely to happen. An additional drawback is there is only one point contact made between the roller and the notch. Also, because the wheel is rotatably mounted to the spring it may easily be forced from the notch, perhaps by an inadvertent bump to the carrier.

The invention, as set forth and described hereinafter, overcomes these problems, as well as others, encountered in optical instruments, such as microscopes.

SUMMARY OF THE INVENTION

The present invention provides an indexing mechanism for an optical instrument, such as a multi-objective nosepiece microscope. The mechanism incorporates a wheel and a locating member. The wheel is rotatably mounted to a resilient member such as a spring while the locating member, which is slightly larger than the rotatable wheel, is fixably mounted thereto. The spring is affixed to a support of the instrument.

A flange having a plurality of detents is formed on the nosepiece shell, which rotates relative to the support. The number of detents generally corresponds to the number of objective receiving apertures in the nosepiece. The spring member is affixed to the support in such a manner that the wheel engages the flange of the nosepiece. As the nosepiece is revolved, the rotating wheel rolls along the flange until it engages one of the slots. At that time, the spring forces the rotating wheel down into the detent. The fixed locating member which is larger in diameter than the rotatable wheel is, thereby, brought into engagement with the detent. As the locating member is fixed and non-rotatable, it provides a substantially positive locating and locking action ensuring that the selected objective which corresponds to the detent is firmly and accurately aligned with the optical axis of the instrument. In order to change the power of the objective, the operator merely applies enough torque to force the spring-loaded fixed locating member out of the detent. Once this is accomplished, the rotating wheel engages the flange and, essentially, torque-free rotation of the nosepiece may be accomplished.

The objectives may be changed repeatedly with no fear of losing tight tolerances needed to maintain the par-centration accuracy of the instrument.

A further feature of the invention is that the indexing mechanism may be utilized to act as a switch to control some electrical function of the instrument. By insulating the spring and rotating disc from the support arm, nosepiece and fixed member, a source of electrical power may be supplied which is interrupted when the insulated rotating wheel engages the non-insulated nosepiece.

BRIEF DESCRIPTION OF THE DRAWINGS

FIG. 1 is a partially sectioned side elevational view of a rotatable nosepiece assembly for an optical instrument, such as a microscope, showing the indexing mechanism in position in a detent slot in the nosepiece shell;

FIG. 2 is a view similar to FIG. 1 showing, however, the nosepiece in a rotated position and the indexing mechanism out of the detent slot;

FIG. 3 is an enlarged sectional view of the indexing mechanism;

FIG. 4 is an enlarged partial view of the indexing mechanism taken in the direction of arrows 4—4 of FIG. 2; and FIG. 5 is a view, at reduced scale, similar to FIG. 4 showing the indexing mechanism in an indexing slot.

DETAILED DESCRIPTION OF THE PREFERRED EMBODIMENT

An optical instrument 10, such as a microscope, has a support 12 and a nosepiece assembly 14 rotatably mounted thereto. The support 12 includes an aperture 16. A bushing 18 having an internal thread 20 is press fit into aperture 16. The nosepiece shell 22 of nosepiece assembly 14 has a central bore 24 with a tapered seat 26. To secure the shell 22 to the support 12, stud 28 is placed through bore 24 and threaded into internal thread 20 of bushing 18, as illustrated in FIG. 1. A bushing 30 having a flange 32 is slidably mounted over bushing 18. A bearing ring 34 is situated in bore 24 between the tapered seat 26 and the bushing flange 32. A coil spring assembly 36, captured between the shouldered head 37 of stud 28 and the bushing flange 32, exerts pressure against the bearing ring 34. The nosepiece shell 22 has a machined surface 39 which receives bearing assembly 38. Bearing 38 is adjustably mounted to support arm 12 by techniques well known in the art such as illustrated in the previously referenced patent to Bowerman.

The nosepiece shell 22 has a plurality of threaded apertures 40. Objectives, such as illustrated at 42 and 42' are fitted in each of the apertures 40. The objectives would be in a range of powers from, for instance, 2½x to 100x. Nosepiece shell 22 also includes a flange 44 having a plurality of detents 46. The number of detents would be equal to the number of objective apertures 40 which are formed in the shell 22.

The indexing mechanism 48, as best seen in FIG. 3, comprises a leaf spring 56, a fixed member 58 and a rotatable wheel 60. The leaf spring 56 is secured to surface 50 of support 12 and insulated therefrom, for reasons which will be evident, by nut and bolt 52 and insulating shoulder washers 54 as illustrated in FIGS. 1 and 2. The fixed member 58, preferably made from stainless steel, is secured to spring 56 by machine screw 62 so that it is non-rotatable. The rotatable wheel 60, which is also preferably made from stainless steel, is insulated from spring 56 and fixed non-rotatable member 58 by washers 64 and 66 which are made from an insulating material, such as plastic. The washers are firmly held between the spring 56 and the fixed member 58. Member 58 and wheel 60 are assembled to the spring 56 in a stacked relationship with the rotating wheel 60 between the spring 56 and the fixed member 58. A slight clearance (not shown) is provided between the insulating washers 64 and 66 and the wheel 60 to enable rotation.

By referring to FIG. 1 it will be seen that, when objective 42 on the nosepiece assembly 14 is in alignment with the optical axis 64 of the instrument 10, leaf spring 56 of indexing mechanism 48 holds the fixed member 58 and rotating wheel 60 in one of the detent slots 46 of nosepiece shell 22. Since, as is evident by inspecting FIGS. 3 and 5, fixed member 58 is slightly larger in diameter than the rotating wheel 60, only the fixed member 58 engages the slot 46. Slots 46 are radiused (see FIGS. 4 and 5) to approximately match the diameter of the fixed member 58, resulting in line, rather than point, contact between them. The pressure exerted by the leaf spring 56 through the fixed member 58 against the radiused detent 46 holds the nosepiece assembly 14 with the desired objective firmly in place.

In order to change objectives, it is only necessary to rotate the nosepiece shell 22 about the axis of threaded stud 28. However, in order to accomplish this rotation, the fixed member 58 must be forced out of the detent 46 in which it is positioned. Sufficient torque applied to the nosepiece shell 22 will cause the leaf spring 56 to flex and the fixed member 58 to move up out of the detent 46. By referring to FIG. 2 it will be seen that the flexing action of the leaf spring 56 effectively changes the angle at which the fixed member 58 and rotating wheel 60 are presented to surface 67 of the flange 44. Specifically, flexing the spring 56 tilts the assembly 48 causing the rotating wheel 60 to come into engagement with the inner surface 67 of flange 44. As the nosepiece shell 22 is continued to be revolved, the rotating wheel 60 rolls along the flange surface 67 with essentially no friction.

When the nosepiece shell has been rotated sufficiently to bring the next objective into approximate alignment with the rotating wheel 60, the pressure exerted by leaf spring 56 forces both the rotating wheel 60 and the fixed member 58 into the detent 46 associated with the selected objective. The fixed member 58, as described hereinabove, is somewhat larger than the rotating wheel 60. Therefore, as best seen in FIG. 5 it engages and seats in detent 46.

The pressure exerted by leaf spring 56 through fixed member 58 and against detent 46 is very positive. Consequently, an inadvertent bump to the nosepiece shell will not dislodge it from position. This feature is also desirable in that as each detent position is engaged it is done positively and the chance of rotating the nosepiece shell past the desired objective is reduced. However, once the fixed member 58 is moved out of engagement with the detent 46, the nosepiece shell 22 may be rotated very easily and with a minimal amount of torque.

Since the fixed member 58 and rotating wheel 60 are, preferably, made from stainless steel they have excellent wear characteristics. This is especially important to insure that repeatability may be accomplished through countless revolutions of the nosepiece shell. Par-centration of the instrument is thereby achieved.

By insulating the spring 56 and the rolling wheel 60 from the support 12 the detenting mechanism 48 may be utilized as a switch to, for instance, effectively control an electrical function of the instrument 10. By attaching a hot wire 68 to the leaf spring at, for instance, mounting nut and bolt assembly 52, and by grounding the nosepiece assembly 22 through stud 28 and support arm 12, a circuit will be made when the fixed non-insulated member 58 is seated in a detent 46. That is, the current will flow from an electrical source through the hot wire 68, leaf spring 56, fixed member 58, nosepiece shell 22 and to ground through the support 12. When the nosepiece shell 22 is rotated about stud 28 the rotating wheel 60 engages flange surface 67. As the wheel 60 is insulated, the flow of electrical current is interrupted. The indexing mechanism 48 thereby acts as a switch controlling the flow of current to whatever portion of the instrument as may be desired.

It should be understood that only certain embodiments of this invention have been shown and described in detail. There are other embodiments and modifications which could be made to the present invention without departing from the spirit or scope of the invention as set forth and defined in the appended claims.

I claim:

1. Apparatus for indexing a rotatable member relative to a support of an optical instrument to align one of a plurality of objectives mounted to said rotatable member with the optical axis of said optical instrument, said apparatus comprising:
   (a) a support;
   (b) first means, rotatably mounted to said support, having a flange with a plurality of detents spaced around the perimeter thereof;
   (c) resilient means mounted to said support adjacent said first means;
   (d) second means, rotatably mounted to said resilient means for rotational engagement with said flange between said detents of said first means; and
   (e) locating means non-rotatably mounted to said resilient means for engagement with said detents, whereby as said first rotatable means is rotated said second means rolls along said flange until one of said detents is encountered at which time said resilient means forces said non-rotatable locating means into engagement with said one of said detents.

2. The apparatus as set forth in claim 1, wherein said second means and said locating means are mounted to said resilient means coaxially and in stacked relationship to each other.

3. The apparatus as set forth in claim 2, wherein said second means and said locating means are circular in shape.

4. The apparatus as set forth in claim 3, wherein said second means is smaller in diameter than said locating means.

5. The apparatus as set forth in claim 2, wherein said plurality of detents in said flange are dimensioned to receive and hold said locating means.

6. The apparatus as set forth in claim 5, wherein said plurality of detents in said flange are radiused to match the diameter of said locating means.

7. Apparatus for indexing a rotatable member of an optical instrument and controlling an electrical function thereof, comprising:
   (a) a support;
   (b) a member rotatably mounted to said support having a flange with a plurality of detents spaced around the perimeter thereof;
   (c) an indexing and switching mechanism having,
      (1) a resilient member mounted to said support adjacent said rotatable member;
      (2) first means rotatably mounted to said resilient member for rolling engagement with said flange between said detents as said rotatable member is rotated;
      (3) second means non-rotatably mounted to said resilient member for engagement with, and reception in, said plurality of detents formed in said flange; and
   (d) means for supplying electrical current through said indexing and switching mechanism when said second means is received in one of said detents and interrupting the flow of electrical current when said first means is in engagement with said flange.

8. The apparatus as set forth in claim 7, further including means for insulating said indexing and switching mechanism from said rotatable member and said support when said first means is in engagement with said flange.

* * * * *